(12) United States Patent
Asazawa et al.

(10) Patent No.: US 8,945,791 B2
(45) Date of Patent: Feb. 3, 2015

(54) OXYGEN SIDE ELECTRODE FOR A FUEL CELL

(75) Inventors: Koichiro Asazawa, Shiga (JP); Koji Yamada, Shiga (JP); Hirohisa Tanaka, Shiga (JP); Kazuya Yamamoto, Shiga (JP); Tim Olson, Arvada, CO (US); Svitlana Pylypenko, Arvada, CO (US); Plamen Atanassov, Albuquerque, NM (US)

(73) Assignees: Daihatsu Motor Co. Ltd., Osaka (JP); STC UNM, Albuquerque, NM (US)

( * ) Notice: Subject to any disclaimer, the term of this patent is extended or adjusted under 35 U.S.C. 154(b) by 0 days.

(21) Appl. No.: 13/636,606

(22) PCT Filed: Mar. 23, 2011

(86) PCT No.: PCT/JP2011/056874
§ 371 (c)(1),
(2), (4) Date: Sep. 21, 2012

(87) PCT Pub. No.: WO2011/122399
PCT Pub. Date: Oct. 6, 2011

(65) Prior Publication Data
US 2013/0011765 A1      Jan. 10, 2013

(30) Foreign Application Priority Data

Mar. 31, 2010   (JP) ................. 2010-083718

(51) Int. Cl.
| | |
|---|---|
| *H01M 8/10* | (2006.01) |
| *H01M 4/90* | (2006.01) |
| *H01M 4/88* | (2006.01) |
| *H01M 4/86* | (2006.01) |

(52) U.S. Cl.
CPC .......... *H01M 4/8605* (2013.01); *H01M 4/9008* (2013.01); *Y02T 90/32* (2013.01); *H01M 8/1011* (2013.01); *H01M 4/8828* (2013.01); *Y02E 60/523* (2013.01); *H01M 2250/20* (2013.01); *H01M 4/9083* (2013.01); *H01M 2004/8689* (2013.01)
USPC ............................ 429/485; 429/482; 429/484

(58) Field of Classification Search
None
See application file for complete search history.

(56) References Cited

U.S. PATENT DOCUMENTS

| | | |
|---|---|---|
| 2008/0233466 A1 | 9/2008 | Yuasa et al. |
| 2009/0246601 A1 | 10/2009 | Iwata et al. |
| 2010/0035111 A1 | 2/2010 | Asazawa et al. |

FOREIGN PATENT DOCUMENTS

| | | |
|---|---|---|
| CN | 1674330 A | 9/2005 |
| JP | 2000-157871 A | 6/2000 |
| JP | 2005-044664 A | 2/2005 |
| JP | 2005-066592 A | 3/2005 |
| JP | 2007-237092 A | 9/2007 |
| WO | 2006/083029 A1 | 8/2006 |
| WO | 2008/117485 A1 | 10/2008 |

*Primary Examiner* — Sarah A Slifka
(74) *Attorney, Agent, or Firm* — Jean C. Edwards, Esq.; Edwards Neils PLLC

(57) ABSTRACT

In a fuel cell including an electrolyte layer allowing an anion component to migrate, and a fuel-side electrode and an oxygen-side electrode arranged to face each other while sandwiching the electrolyte layer, the oxygen-side electrode contains a first catalyst containing a first transition metal and polypyrrole, and a second catalyst containing a second transition metal and a porphyrin ring-containing compound so that the mixing ratio of the first catalyst relative to 100 parts by mass of the total amount of the first catalyst and the second catalyst is more than 10 parts by mass, and below 90 parts by mass.

2 Claims, 3 Drawing Sheets

OXYGEN SIDE ELECTRODE FOR A FUEL CELL

CROSS-REFERENCE TO RELATED APPLICATIONS

The present invention is a 35 U.S.C. 371 National Stage Entry of PCT/JP2011/056874, filed Mar. 23, 2011, which claims priority from Japanese Patent Application No. 2010-083718, filed on Mar. 31, 2010, the contents all of which are herein incorporated by reference.

TECHNICAL FIELD

The present invention relates to a fuel cell.

BACKGROUND ART

Heretofore, various fuel cells such as alkaline fuel cells (AFC), polymer electrolyte fuel cells (PEFC), phosphoric acid fuel cells (PAFC), Molten Carbonate Fuel Cells (MCFC), and Solid Oxide Fuel Cells (SOFC) have been known. These fuel cells are examined for use in various applications, for example, in automobile application.

For example, a polymer electrolyte fuel cell includes a fuel-side electrode (anode) to which a fuel is supplied, and an oxygen-side electrode (cathode) to which oxygen is supplied, and these electrodes are disposed to face each other with an electrolyte layer composed of a solid polymer membrane interposed therebetween. In such a fuel cell, hydrogen gas is supplied to the anode, and air is supplied to the cathode, which generates an electromotive force between the anode-cathode, thereby allowing power generation.

As such a polymer electrolyte fuel cell, for example, Patent Document 1 has proposed a fuel cell including a fuel-side electrode (anode), an oxygen-side electrode (cathode) including a cobalt-supported composite composed of polypyrrole and carbon (carbon composite), and an electrolyte in which an anion component can migrate (for example, see Patent Document 1 below).

With such a fuel cell, the oxygen-side electrode (cathode) contains a polypyrrole carbon composite on which cobalt is supported, and thus the oxygen reduction reaction in the oxygen-side electrode (cathode) can be activated, and power-generating performance can be improved.

CITATION LIST

Patent Document

Patent Document 1 International Patent Publication WO 2008/117485

SUMMARY OF THE INVENTION

Problem to be Solved by the Invention

However, in these days, a fuel cell with more excellent power-generating performance than the fuel cell described in the above-described Patent Document 1 above has been in demand.

An object of the present invention is to provide a fuel cell in which the oxygen reduction reaction in the cathode (oxygen-side electrode) is activated, allowing more improvement in power-generating performance.

Means for Solving the Problem

To achieve the above object, a fuel cell of the present invention includes an electrolyte allowing an anion component to migrate; and a fuel-side electrode and an oxygen-side electrode arranged to face each other while sandwiching the electrolyte, wherein the oxygen-side electrode contains a first catalyst containing a first transition metal and polypyrrole, and a second catalyst containing a second transition metal and a porphyrin ring-containing compound, and the mixing ratio of the first catalyst relative to 100 parts by mass of the total amount of the first catalyst and the second catalyst is more than 10 parts by mass and below 90 parts by mass.

In the fuel cell of the present invention, it is preferable that the mixing ratio of the first catalyst relative to 100 parts by mass of the total amount of the first catalyst and the second catalyst is 20 to 80 parts by mass.

In the fuel cell of the present invention, it is preferable that the first transition metal and the second transition metal are cobalt.

Effects of the Invention

In the fuel cell of the present invention, an oxygen-side electrode contains a first catalyst containing a first transition metal and polypyrrole, and a second catalyst containing a second transition metal and a porphyrin ring-containing compound so that the mixing ratio of the first catalyst relative to 100 parts by mass of the total amount of the first catalyst and the second catalyst is more than 10 parts by mass and below 90 parts by mass. Therefore, with the fuel cell of the present invention, the oxygen reduction reaction in the oxygen-side electrode can be activated, and as a result, the power-generating performance of the fuel cell can be improved.

DESCRIPTION OF EMBODIMENTS

Figure 1:
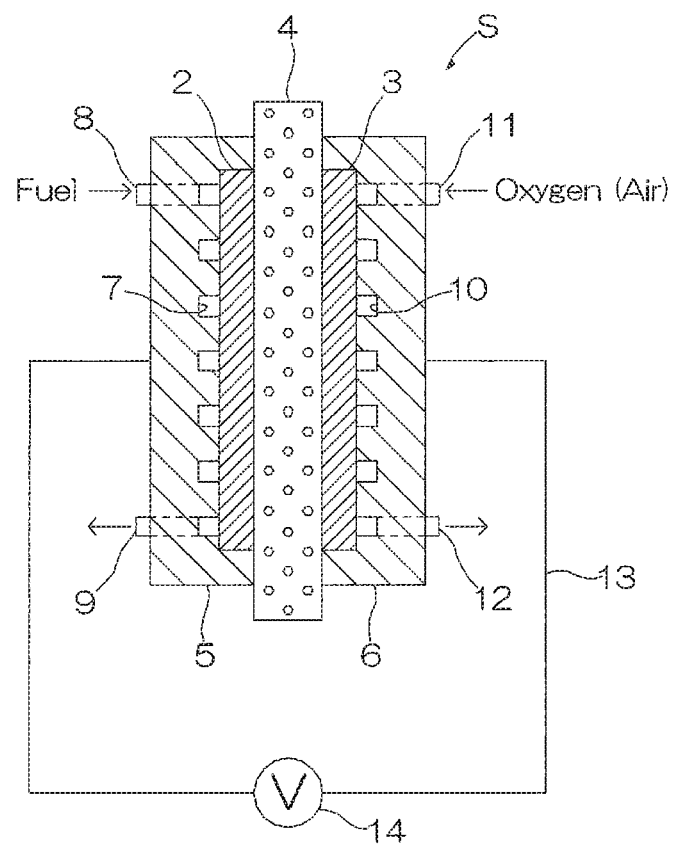
FIG. 1 is a schematic diagram illustrating a configuration of a fuel cell in an embodiment of the present invention.

FIG. 1 is a schematic diagram illustrating a configuration of a fuel cell in an embodiment of the present invention.

A fuel cell 1 is a polymer electrolyte fuel cell, and includes a plurality of fuel cells S, and formed into a stack structure in which these fuel cells S are stacked. In FIG. 1, only a single fuel cell S is shown for easier illustration.

The fuel cell S includes a fuel-side electrode 2 (anode), an oxygen-side electrode 3 (cathode), and an electrolyte layer 4.

The fuel-side electrode 2 is not particularly limited, and includes a catalyst (fuel-side catalyst).

To be more specific, the fuel-side electrode 2 is formed, for example, from a catalyst carrier supporting a catalyst.

The catalyst is not particularly limited, and examples thereof include Groups 8 to 10 (VIII) elements such as platinum group elements (ruthenium (Ru), rhodium (Rh), palladium (Pd), osmium (Os), iridium (Ir), and platinum (Pt)), and iron group elements (iron (Fe), cobalt (Co), and nickel (Ni)); and Group 11 (IB) elements such as copper (Cu), silver (Ag), and gold (Au) in the periodic table (IUPAC Periodic Table of the Elements (version date 22 Jun. 2007). The same applies in the following.).

These catalysts may be used singly or in combination of two or more.

For the catalyst, preferably, Groups 8 to 10 (VIII) elements in the periodic table are used, more preferably, an iron group element is used, and even more preferably, nickel is used.

The support concentration of the catalyst (proportion of the catalyst content relative to the total amount of the catalyst and the catalyst carrier) is, for example, 1 to 99 mass %, preferably 2 to 95 mass %.

The catalyst carrier is not particularly limited, and examples thereof include resins such as an anion exchange resin having an anion exchange group, and porous materials such as carbon.

These catalyst carriers may be used singly or in combination of two or more.

For the catalyst carrier, preferably, a resin is used; and more preferably, an anion exchange resin having an anion exchange group is used.

To form the fuel-side electrode 2 using the catalyst carrier supporting a catalyst, for example, a membrane-electrode assembly is formed along with the electrolyte layer 4 by a known method.

To be more specific, first, an electrode ink to be used for formation of the fuel-side electrode 2 is prepared. In the preparation of the electrode ink, first, 1 to 60 parts by mass of a catalyst is added relative to 100 parts by mass of the above-described catalyst carrier, and then the mixture is blended. Examples of the blending method include a known blending method such as, for example, dry blending.

Then, 100 parts by mass of the obtained mixture is added to 100 to 10000 parts by mass of a solvent, and the mixture is stirred, thereby preparing an electrode ink of the catalyst carrier supporting a catalyst.

Examples of the solvent include known solvents, including lower alcohols such as methanol, ethanol, and 1-propanol; ethers such as tetrahydrofuran; and water. These solvents may be used singly or in combination of two or more.

The stirring temperature at that time is, for example, 10 to 30° C., and the stirring time is, for example, 1 to 60 minutes.

Then, the obtained electrode ink is applied so as to cover one surface of the electrolyte layer 4.

Examples of the application method of the electrode ink include known application methods such as spraying method, die coating method, and ink jet method, and preferably, the spraying method is used.

Thereafter, the applied electrode ink is dried at, for example, 10 to 40° C.

In this manner, a fuel-side electrode 2 that is fixed on one side surface of the electrolyte layer 4 can be obtained.

The amount of the catalyst used is, for example, 0.01 to 10 mg/cm$^2$. The amount of the catalyst carrier supporting a catalyst used is, for example, 0.01 to 10 mg/cm$^2$. The thickness of the fuel-side electrode 2 that was fixed on one side surface of the electrolyte layer 4 is, for example, 0.1 to 100 μm, preferably 1 to 10 μm.

The oxygen-side electrode 3 includes a first catalyst and a second catalyst.

In the present invention, the first catalyst includes a first transition metal and polypyrrole.

Examples of such a first catalyst include, to be more specific, a composite composed of polypyrrole and carbon (hereinafter, this composite is referred to as "carbon composite") on which the first transition metal is supported.

Examples of the first transition metal include transition metals such as scandium (Sc), titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), technetium (Tc), ruthenium (Ru), rhodium (Rh), palladium (Pd), silver (Ag), lanthanum (La), hafnium (Hf), tantalum (Ta), tungsten (W), rhenium (Re), osmium (Os), iridium (Ir), platinum (Pt), and gold (Au).

These first transition metals may be used singly or in combination of two or more.

For the first transition metal, preferably, cobalt is used.

Polypyrrole is a polymer of pyrrole (monomer), and for example, can be obtained by polymerization of pyrrole (monomer) as described later.

In such a case, the degree of polymerization of pyrrole is not particularly limited, and can be set suitably in accordance with the purpose and application. Such polypyrrole can also contain pyrrole (unreacted pyrrole), and proportion of the pyrrole content is not particularly limited, and is set suitably in accordance with the purpose and application.

The mixing ratio of the polypyrrole relative to 100 parts by mass of the carbon is, for example, 1 to 100 parts by mass, preferably 10 to 50 parts by mass.

Examples of the carbon include known carbons, such as carbon black.

To produce the first catalyst, for example, a carbon composite is formed, and thereafter, a first transition metal is supported on the carbon composite.

To be more specific, first, 100 to 1000 parts by mass of a solvent is added to 100 parts by mass of carbon, and the solvent is stirred, thereby preparing a carbon dispersion liquid in which carbon is dispersed in the solvent. At this time, as necessary, organic acid such as acetic acid, and oxalic acid may be added suitably, and the addition amount relative to 100 parts by mass of carbon is, for example, 1 to 50 parts by mass.

Examples of the solvent include known solvents such as water and lower alcohols such as methanol, ethanol, and propanol.

The stirring temperature is, for example, 10 to 30° C., and the stirring time is, for example, 10 to 60 minutes.

Then, for example, 1 to 50 parts by mass, preferably, 10 to 20 parts by mass of pyrrole (monomer) relative to 100 parts by mass of carbon is added to the carbon dispersion liquid, and then the mixture is stirred. The stirring temperature at this time is, for example, 10 to 30° C., and the stirring time is, for example, 1 to 10 minutes.

Then, pyrrole in the carbon dispersion liquid is polymerized. The pyrrole is polymerized by oxidation polymerization such as chemical oxidation polymerization and electrolytic oxidation polymerization. Preferably, chemical oxidation polymerization is used.

In the chemical oxidation polymerization, a catalyst for oxidation polymerization is added to the carbon dispersion liquid containing the pyrrole, and the mixture is then stirred to thereby polymerize the pyrrole. Examples of the catalyst for oxidation polymerization include known catalysts for oxidation polymerization, such as peroxides such as hydrogen peroxide and benzoyl peroxide; and permanganic acids such as potassium permanganate and magnesium permanganate. Of these examples, hydrogen peroxide is preferable. During the polymerization of the pyrrole, the stirring temperature (polymerization temperature) is, for example, 10 to 30° C., and the stirring time is, for example, 10 to 90 minutes.

Thereafter, the dispersion liquid in which a carbon composite made of the carbon and the polypyrrole is dispersed is filtered, washed, and vacuum dried at a temperature of, for example, 50 to 100° C. Thus, a dry powder of the carbon composite is obtained.

After the carbon composite is obtained, a first transition metal is supported on the carbon composite.

More specifically, 100 to 3000 parts by mass of a solvent is added to 100 parts by mass of the carbon composite, and the mixture is then stirred. Thus, a carbon composite dispersion liquid having the carbon composite dispersed in the solvent is prepared. Examples of the solvent include those mentioned above.

In the meantime, 1 to 150 parts by mass of the first transition metal relative to 100 parts by mass of the carbon composite is dissolved in 100 to 1000 parts by mass of the solvent to prepare a first transition metal-containing solution. Then, the first transition metal-containing solution is added to the carbon composite dispersion liquid, and the mixture is then stirred to prepare a mixed solution of the first transition metal-containing solution and the carbon composite dispersion liquid. At this time, the stirring temperature is, for example, 50 to 100° C., and the stirring time is, for example, 10 to 60 minutes.

Subsequently, a reducing agent-containing solution containing a reducing agent is added to the mixed solution of the first transition metal-containing solution and the carbon composite dispersion liquid until the mixed solution thereof has a pH in the range of 10 to 12, and thereafter, the mixture is allowed to stand at 60 to 100° C. for 10 to 60 minutes. Thus, the first transition metal is supported on the carbon composite.

Examples of the reducing agent contained in the reducing agent-containing solution include, for example, known reducing agents such as sodium borohydride, potassium borohydride, lithium borohydride, and hydrazine, and preferably, sodium borohydride is used. For example, in the case of using sodium borohydride as the reducing agent, sodium borohydride is dissolved together with sodium hydroxide in water to prepare an aqueous solution thereof, and the aqueous solution thereof is added to the mixed solution under a nitrogen atmosphere. Thus, a contact of sodium borohydride with oxygen can be prevented, thereby preventing the sodium borohydride from being decomposed due to such contact with oxygen.

Thereafter, the mixed solution that has been allowed to stand is filtered, washed, and vacuum dried at a temperature of, for example, 50 to 100° C. Thus, a dry powder of the carbon composite having the first transition metal supported thereon is obtained.

In the first catalyst, the support concentration of the first transition metal (proportion of the first transition metal supported relative to the total amount of the first catalyst) is in the range of, for example, 0.1 to 60 mass %, preferably 1 to 40 mass %.

In the present invention, the second catalyst includes a second transition metal and a porphyrin ring-containing compound.

Examples of such a second catalyst include, to be more specific, a porphyrin complex in which the second transition metal is coordinated in the porphyrin ring-containing compound.

Examples of the second transition metal include, for example, those transition metals given as examples of the above-described first transition metal.

These second transition metals may be used singly or in combination of two or more.

For the second transition metal, preferably, cobalt is used.

For the second transition metal, preferably, a transition metal that is the same as the above-described first transition metal is used.

In the present invention, the porphyrin ring-containing compound is defined as a compound containing a porphyrin ring (a ring in which four pyrrole rings are bonded at α-position via four methine groups (—CH=)) in its molecule skeleton.

In such a porphyrin ring-containing compound, for example, the nitrogen atom contained in the porphyrin ring becomes a ligand coordinated to the second transition metal in a porphyrin complex.

The porphyrin ring-containing compound is not particularly limited, and examples thereof include porphyrin (unsubstituted, also called: porphin), tetramethylporphyrin, tetraethylporphyrin, tetraphenylporphyrin, tetraphenoxyporphyrin, and tetramethoxyphenylporphyrin (e.g., tetrakis(p-methoxyphenyl)porphyrin, etc.).

These porphyrin ring-containing compounds may be used singly or in combination of two or more.

For the porphyrin ring-containing compound, preferably, tetramethoxyphenylporphyrin is used.

The production of the porphyrin complex is not particularly limited, and a known method may be used.

For example, the porphyrin complex can be produced by mixing a salt of the second transition metal (e.g., inorganic salts such as sulfate, nitrate, chloride, phosphate, and organic acid salt such as acetate, oxalate, etc.), and the porphyrin ring-containing compound, in a known solvent such as water, alcohol, aliphatic hydrocarbon, aromatic hydrocarbon, halogenated hydrocarbon, and nitriles.

The mixing ratio of the salt of the second transition metal to the porphyrin ring-containing compound in such a reaction is, for example, such that the number of moles of the second transition metal is equal or more relative to the number of moles of the porphyrin ring-containing compound, to be more specific, such that the second transition metal in the salt of the second transition metal is, for example, 1.1 to 30 mol, preferably 5 to 20 mol relative to 1 mol of the porphyrin ring in the porphyrin ring-containing compound.

The porphyrin complex can be obtained from a commercially available product, and examples of such include a cobalt-tetrakis(p-methoxyphenyl) porphyrin complex (CAS No. 28903-71-1, manufactured by Sigma-Aldrich Co. LLC.).

These porphyrin complexes may be used singly or in combination of two or more.

In the second catalyst, the proportion of the second transition metal content (proportion of the second transition metal content relative to the total amount of the second catalyst) is in the range of, for example, 1 to 50 mass %, preferably, 2 to 10 mass %.

The second catalyst may be used as is, and preferably, heat-treated before use.

In the heat treatment, for example, the second catalyst is heated under an inert gas (e.g., nitrogen gas, argon gas, etc.) atmosphere.

The heat treatment conditions are as follows: a heat treatment temperature of, for example, 400 to 900° C., preferably 600 to 800° C., and a heat treatment time of 1 to 10 hours, preferably 2 to 5 hours.

By subjecting the second catalyst to a heat treatment, the oxygen reduction activity of the second catalyst can be improved.

On the other hand, when the second catalyst is subjected to a heat treatment, the second catalyst is aggregated and its grain growth is caused, which decreases its effective surface area, and as a result, the catalytic activity may be reduced. In such a case, to sufficiently ensure the effective surface area, preferably, pores are formed on the surface of the second catalyst.

The method of forming the pores on the second catalyst surface is not particularly limited, and a known method such as the following is used: soluble particles are embedded in the second catalyst, and thereafter, the soluble particles on the second catalyst surface are removed.

In this method, for example, first, the above-described second catalyst before the heat treatment and the soluble particles are mixed.

The soluble particles are not particularly limited, and examples thereof include those particles that can be dispersed homogeneously with the second catalyst when the second catalyst and the soluble particles are mixed; can be distributed homogeneously on the second catalyst surface without being melt in the above-described heat treatment; and can be dissolved and removed by acid or alkaline treatment after the heat treatment.

Examples of such soluble particles include amorphous silica, fumed silica, colloidal silica, and calcined products thereof.

These soluble particles may be used singly or in combination of two or more.

For the soluble particles, preferably, amorphous silica is used.

In the mixing, for example, first, the second catalyst is dissolved and/or dispersed in a solvent.

The solvent is not particularly limited, and examples thereof include water; polar protic solvents (e.g., alcohols such as methanol, ethanol, isopropanol, glycol, etc.); polar aprotic solvents (e.g., N,N-dimethylformamide (DMF), N,N-dimethylacetamide (DMAC), dimethyl sulfoxide (DMSO), N-methylpyrrolidone (NMP), acetinitrile, piperidine, etc.); amines (e.g., ammonia, triethylamine, pyridine, etc.); ethers (e.g., dioxane, tetrahydrofuran (THF), etc.); and aromatic hydrocarbons (e.g., benzene, toluene, xylene, etc.).

These solvents may be used singly or in combination of two or more.

For the solvent, preferably, ethers, more preferably tetrahydrofuran is used.

The mixing ratio of the solvent to the second catalyst is, for example, 1000 to 100000 parts by mass, preferably 5000 to 50000 parts by mass of the solvent relative to 100 parts by mass of the second catalyst.

The solution and/or dispersion liquid of the second catalyst is obtained in this manner.

Next, in this method, the obtained solution and/or dispersion liquid of the second catalyst and the soluble particles are mixed by a known method such as wet blending.

The mixing ratio of the soluble particles to the solution and/or dispersion liquid of the second catalyst is, 10 to 500 parts by mass, preferably 50 to 200 parts by mass of the soluble particles relative to 100 parts by mass of the second catalyst (solid content) in the solution and/or dispersion liquid of the second catalyst.

The solution and/or dispersion liquid of the second catalyst and the soluble particles is obtained in this manner.

Next, in this method, the obtained solution and/or dispersion liquid of the second catalyst and the soluble particles is dried.

The drying conditions are as follows: a drying temperature of, for example, −25 to 80° C., preferably 15 to 50° C.; and a drying time of, for example, 5 to 48 hours.

Then, the second catalyst and the soluble particles are heat treated under the above-described heat treatment conditions, thereby producing the second catalyst with the soluble particles embedded on the surface thereof.

Thereafter, in this method, the soluble particles of the second catalyst surface are removed.

For example, when amorphous silica is used as the soluble particles, the heat treatment may cause the amorphous silica to crystallize to produce silica (calcined product). In such a case, to remove such silica, for example, the second catalyst is subjected to alkaline treatment.

For the alkaline treatment, the second catalyst is immersed in, for example, an alkaline solution such as potassium hydroxide, and sodium hydroxide. Thus, the soluble particles are dissolved, and as a result, pores are formed on the second catalyst surface.

With such a second catalyst, even if the second catalyst is aggregated and its grain growth is caused by the heat treatment, the pores formed on the surface thereof sufficiently ensure the effective surface area of the second catalyst, and therefore excellent catalytic activity can be maintained.

The method of removing the soluble particles is not limited to the one described above, and can be selected suitably in accordance with the type of the soluble particles from, for example, a water immersion method, and an acid treatment method.

To form an oxygen-side electrode 3 containing the first catalyst and the second catalyst, for example, an electrode ink is prepared in the same manner as the above-described method for the fuel-side electrode 2, and the electrode ink is applied and dried on the other surface of the electrolyte layer 4 (the other side of the side where the fuel-side electrode 2 is fixed), thereby forming a membrane-electrode assembly along with the electrolyte layer 4.

In this manner, the oxygen-side electrode 3 can be obtained: the oxygen-side electrode 3 is fixed to the other side surface of the electrolyte layer 4, the other side surface of the electrolyte layer 4 being the one different from one side surface of the electrolyte layer 4 to which the fuel-side electrode 2 is fixed. That is, the oxygen-side electrode 3 is fixed to the other side surface of the electrolyte layer 4, whereby the fuel-side electrode 2 and the oxygen-side electrode 3 are arranged to face each other while sandwiching the electrolyte layer 4, thereby forming the membrane-electrode assembly.

In the oxygen-side electrode 3, the mixing ratio of the first catalyst relative to 100 parts by mass of the total amount of the first catalyst and the second catalyst is, more than 10 parts by mass and below 90 parts by mass.

When the mixing ratio of the first catalyst is in the above-described range, the oxygen reduction reaction in the oxygen-side electrode can be activated, and as a result, power-generating performance of the fuel cell can be improved.

On the other hand, when the mixing ratio of the first catalyst is the above-described upper limit or more, the first catalyst and the second catalyst work antagonistically, and the activity of the oxygen reduction reaction is reduced. Therefore, compared with the case where the first catalyst or the second catalyst is used singly, power-generating performance of the fuel cell is reduced.

When the mixing ratio of the first catalyst is the above-described lower limit or less as well, the first catalyst and the second catalyst work antagonistically, and the activity of the oxygen reduction reaction is reduced. Therefore, in this case as well, compared with the case where the first catalyst or the second catalyst is used singly, power-generating performance of the fuel cell is reduced.

The mixing ratio of the first catalyst relative to 100 parts by mass of the total of the first catalyst and the second catalyst is, preferably, 20 to 80 parts by mass, more preferably, 30 to 70 parts by mass.

When the mixing ratio of the first catalyst is in the above-described range, the oxygen reduction reaction in the oxygen-side electrode can be activated even more, and as a result, power-generating performance of the fuel cell can be improved further.

In the oxygen-side electrode 3, the amount of the transition metal in the first catalyst is, for example, 0.05 to 10 mg/cm$^2$, preferably 0.1 to 5 mg/cm$^2$, and the amount of the transition metal in the second catalyst is, 0.04 to 8 mg/cm², preferably 0.08 to 4 mg/cm². The total amount of the transition metal used in the first catalyst and the second catalyst is, for example, 0.09 to 18 mg/cm², preferably 0.18 to 9 mg/cm².

The oxygen-side electrode 3 fixed to the other side surface of the electrolyte layer 4 has a thickness of, for example, 0.1 to 100 μm, and preferably 1 to 100 μm.

The electrolyte layer 4 is a layer allowing an anion component to migrate and is formed, for example, using an anion exchange membrane. The anion exchange membrane is not particularly limited as long as it is a medium allowing a hydroxide ion (OH—), which is an anion component generated at the oxygen-side electrode 3, to migrate from the oxygen-side electrode 3 to the fuel-side electrode 2, and examples thereof include a solid polymer membrane (anion exchange resin) having an anion exchange group such as a quaternary ammonium group and a pyridinium group.

The fuel cell S for fuel cell further includes a fuel supplying member 5 and an oxygen supplying member 6. The fuel supplying member 5 is made of a gas-impermeable electrically-conductive member, and one side thereof is in contact with and is facing one side surface of the fuel-side electrode 2, the one side surface being opposite to the other side surface of the fuel-side electrode 2 making contact with the electrolyte layer 4. Further, this fuel supplying member 5 has a fuel-side channel 7 formed therein for allowing the fuel to come in contact with the entire fuel-side electrode 2 as a zigzag groove which is a depression on one side thereof. In this fuel-side channel 7, a feed opening 8 and a discharge opening 9 are formed continuously at the upstream end and the downstream end thereof, respectively, extending through the fuel supplying member 5.

Similarly to the fuel supplying member 5, the oxygen supplying member 6 is made of a gas-impermeable electrically-conductive member, and one side thereof is in contact with and is facing one side surface of the oxygen-side electrode 3, the one side surface being opposite to the other side surface of the oxygen-side electrode 3 making contact with the electrolyte layer 4. Further, the oxygen supplying member 6, too, has an oxygen-side channel 10 formed therein for allowing oxygen (air) to come in contact with the entire oxygen-side electrode 3 as a zigzag groove which is a depression on one side thereof. In this oxygen-side channel 10, too, a feed opening 11 and a discharge opening 12 are formed continuously at the upstream end and the downstream end thereof, respectively, extending through the oxygen supplying member 6.

As described above, this fuel cell 1 is formed as a stack structure having a plurality of cells S for fuel cell stacked therein. Therefore, the fuel supplying member 5 and the oxygen supplying member 6 are configured as a separator having the fuel-side channel 7 and the oxygen-side channel 10 formed on both sides thereof, though not shown.

Although not shown in FIG. 1, the fuel cell 1 includes a current collector formed by an electrically-conductive material and the electromotive force generated in the fuel cell 1 can be externally withdrawn at the terminals provided in the current collector.

Further, experimentally (on the order of model), a voltage generated at the fuel cell 1 can be measured by a voltmeter 14 provided in an external circuit 13 with which the fuel supplying member 5 and the oxygen supplying member 6 for fuel cell are connected to each other.

Next, electricity generation by the fuel cell 1 will be described.

In the fuel cell 1, electricity is generated by supplying air to the oxygen-side channel 10 and also supplying fuel to the fuel-side channel 7.

Examples of the fuel supplied to the fuel-side channel 7 include compounds containing at least hydrogen, such as hydrogen ($H_2$); hydrocarbons such as methane ($CH_4$), ethane ($C_2H_6$), and propane ($C_3H_8$); alcohols such as methanol ($CH_3OH$) and ethanol ($C_2H_5OH$); hydrazines such as hydrazine ($NH_2NH_2$), hydrated hydrazine ($NH_2NH_2.H_2O$), hydrazine carbonate (($NH_2NH_2)_2CO_2$), hydrazine sulfate ($NH_2NH_2.H_2SO_4$), monomethyl hydrazine ($CH_3NHNH_2$), dimethyl hydrazine (($CH_3)_2NNH_2$, $CH_3NHNHCH_3$) and carbon hydrazide (($NHNH_2)_2CO$); urea ($NH_2CONH_2$); ammonia ($NH_3$); heterocycles such as imidazole, 1,3,5-triazine and 3-amino-1,2,4-triazole; and hydroxylamines such as hydroxylamine ($NH_2OH$) and hydroxylamine sulfate ($NH_2OH.H_2SO_4$). These may be used alone or in combination of two or more.

Of the fuel compounds mentioned above, compounds free of carbon, that is, hydrazine ($NH_2NH_2$), hydrated hydrazine ($NH_2NH_2.H_2O$), hydrazine sulfate ($NH_2NH_2.H_2SO_4$), ammonia ($NH_3$), hydroxylamine ($NH_2OH$), and hydroxylamine sulfate ($NH_2OH.H_2SO_4$) are preferable. When the fuel is such a compound free of carbon, the catalyst is not poisoned by CO, thus achieving improved durability and further realizing substantially zero emission.

As the fuel, the fuel compound exemplified above may be supplied as it is, or may be used in the form of solution in water and/or alcohol (e.g., lower alcohol such as methanol, ethanol, propanol, and isopropanol). In this case, the concentration of the fuel compound in the solution depends on the kind of the fuel compound, and is, for example, 1 to 90% by mass, or preferably 1 to 30% by mass. Further, as the fuel, the fuel compound mentioned above may be supplied in gas form (e.g., vapor).

The electricity generation in the fuel cell 1 will be described more specifically. In the fuel-side electrode 2 where fuel has been supplied, hydrogen ($H_2$) is produced from the fuel, and this hydrogen ($H_2$) is oxidized to release an electron ($e^-$) from the hydrogen ($H_2$), so that a proton ($H^+$) is produced. The electron ($e^-$) released from the hydrogen ($H_2$) reaches the oxygen-side electrode 3 through the external circuit 13. That is, the electron ($e^-$) which passes through the external circuit 13 serves as electric current. On the other hand, in the oxygen-side electrode 3, an electron ($e^-$), water ($H_2O$) supplied from outside or produced by the reaction in the fuel cell 1, and oxygen ($O_2$) in the air flowing through the oxygen-side channel 10 are allowed to react to produce a hydroxide ion ($OH^-$) (see the following reaction formula (2)). Then, the hydroxide ion ($OH^-$) thus produced passes through the electrolyte layer 4, reaching the fuel-side electrode 2. When the hydroxide ion ($OH^-$) reaches the fuel-side electrode 2, in the fuel-side electrode 2, the hydroxide ion ($OH^-$) and the hydrogen ($H_2$) in the fuel are allowed to react to produce an electron ($e^-$) and water ($H_2O$) (see the following reaction formula (1)). The electron ($e^-$) thus produced migrates through the external circuit 13 from the fuel supplying member 5 to the oxygen supplying member 6, and is then supplied to the oxygen-side electrode 3. Such continuous electrochemical reaction at the fuel-side electrode 2 and the oxygen-side electrode 3 forms a closed circuit in the fuel cell 1, thereby producing an electromotive force, resulting in electricity generation.

$$2H_2 + 4OH^- \rightarrow 4H_2O + 4e^- \text{(Reaction at fuel-side electrode 2)} \quad (1)$$

$$O_2 + 2H_2O + 4e^- \rightarrow 4OH^- \text{(Reaction at oxygen-side electrode 3)} \quad (2)$$

$$2H_2 + O_2 \rightarrow 2H_2O \text{(Reaction in the entire fuel cell 1)} \quad (3)$$

The operating conditions of the fuel cell 1 are not particularly limited, and, for example, the pressure at the fuel-side electrode 2 side is set to 100 kPa or less, preferably 50 kPa or less; the pressure at the oxygen-side electrode 3 side is set to 100 kPa or less, preferably 50 kPa or less; and the temperature of the cell S for fuel cell is set to 30° C. to 100° C., preferably 60° C. to 90° C.

In the foregoing, an embodiment of the present invention has been discussed, but the present invention can also be embodied in a different manner.

For example, in the above-mentioned embodiments, the polymer electrolyte fuel cell has been exemplified to describe the present invention. However, the present invention can be applied to various fuel cells such as an alkaline fuel cell using an aqueous solution of KOH or an aqueous solution of NaOH as the electrolyte layer 4, a molten carbonate fuel cell, and a solid oxide fuel cell.

Examples of the use of the fuel cell of the present invention include power supply for driving motor in automobiles, ships, aircrafts, etc., and power supply in communications terminals such as cellular phones.

EXAMPLES

While in the following, the present invention is described with reference to Examples and Comparative Examples, the present invention is not limited to any of them.

Production Example 1

Production of First Catalyst

1) Preparation of Polypyrrole Carbon Composite (PPy-C)

10 g of carbon (Vulcan XC-72 manufactured by E-TEK Inc.; specific surface area: 250 m²/g) and 2.5 mL of acetic acid (acetic acid concentration: 100%) were added to 75 mL of pure water, and the mixture was stirred at room temperature (approximately 25° C.) for 20 minutes to prepare a carbon dispersion liquid having carbon dispersed therein. Subsequently, 2 g of pyrrole (manufactured by Aldrich) was added to the carbon dispersion liquid and stirred at room temperature for 5 minutes.

Further, 10 mL of hydrogen peroxide having a concentration of 10% was added to the carbon dispersion liquid and stirred at room temperature for 1 hour, whereby pyrrole was subjected to oxidation polymerization. Thereafter, the carbon dispersion liquid was filtered, washed with warm water, and vacuum dried at 90° C. Thus, a PPy-C dry powder in which pyrrole was polymerized on carbon was obtained.

2) Preparation of Cobalt Supported PPy-C 2 g of the PPy-C dry powder obtained in step 1) was added to 44 mL of pure water, and the mixture was stirred for 30 minutes while being heated up to 80° C., so that a PPy-C dispersion liquid having PPy-C dispersed therein was obtained. Subsequently, 1.1 g of cobalt nitrate (II) hexahydrate was dissolved in 11 mL of pure water to prepare an aqueous cobalt-containing solution. Then, the aqueous cobalt-containing solution was added to the PPy-C dispersion liquid and the mixture was stirred at 80° C. for 30 minutes to thereby produce a cobalt-PPy-C-mixed solution. Subsequently, 5.23 g of sodium borohydride and 0.37 g of sodium hydroxide were dissolved in 500 mL of pure water to prepare an alkaline aqueous solution. Next, the alkaline aqueous solution was gradually added to the cobalt-PPy-C-mixed solution until the cobalt-PPy-C-mixed solution had a pH of 11.1, and thereafter, the cobalt-PPy-C-mixed solution was allowed to stand at 80° C. for 30 minutes. All the operations that led up to the operation (operation of adding the alkaline aqueous solution) in step 2) were performed under a nitrogen atmosphere. Thereafter, the cobalt-PPy-C-mixed solution was filtered, washed with warm water, and vacuum dried at 90° C. Thus, a dry powder of a cobalt supported PPy-C (support concentration of cobalt: 10 mass %) having cobalt supported on PPy-C was obtained.

Production Example 2

Production of Second Catalyst 1 g of a cobalt-tetrakis(p-methoxyphenyl) porphyrin complex (CAS No. 28903-71-1, manufactured by Aldrich)(hereinafter referred to as porphyrin complex) was dissolved in 200 mL of tetrahydrofuran (THF).

Subsequently, 1 g of amorphous silica (trade name: fumed silica HS-5, manufactured by Cabot Corporation) was added to the obtained solution. After the mixture was stirred, the mixture was dried for one night (10 hours, room temperature). Then, the obtained dried mixture was calcined (heat-treated) under a nitrogen atmosphere at 700° C. for 4 hours.

Subsequently, the obtained calcined mixture was impregnated with 7 mol/L of an aqueous solution of potassium hydroxide, thereby dissolving the silica contained in the calcined mixture, and thereafter, filtered, washed, and dried.

Thereafter, the obtained dried mixture was pulverized, thereby producing a calcined powder of porphyrin complex (cobalt content proportion: 8 mass %).

Reference Example 1

7 mg of a dried powder of the cobalt supported PPy-C obtained in Production Example 1, and 3 mg of a calcined powder of the porphyrin complex obtained in Production Example 2 were mixed (mass ratio cobalt supported PPy-C:porphyrin complex=7:3), thereby producing 10 mg of a powder mixture.

Then, 10 mg of the obtained powder mixture, 800 µL, of pure water, and 200 µL of 2-propanol were mixed, thereby preparing a first ink.

Then, 100 µL of the obtained first ink, 700 µL of pure water, 150 µL of 2-propanol, and 50 µL of a solution of Nafion® (registered trademark DuPont) (ion exchange resin, trade name: Nafion 5 wt % dispersion 70160 (product number), manufactured by Aldrich) diluted with water (×10) (Nafion solution: water=1:10) were mixed, thereby preparing a second ink.

Thereafter, 10 µL of the second ink was weighed out by a micropipette, and added dropwise on a glassy carbon electrode. Thereafter, the glassy carbon was dried to obtain a test piece 1.

In the test piece 1, the amount of the cobalt supported in the electrode was 30 µg/cm².

In the test piece 1, the mass ratio (cobalt derived from cobalt supported PPy-C:cobalt derived from porphyrin complex) of the cobalt derived from cobalt supported PPy-C to the cobalt derived from porphyrin complex was 74:26.

Reference Example 2

A test piece 2 was obtained in the same manner as in Reference Example 1, except that 5 mg of a dried powder of the cobalt supported PPy-C obtained in Production Example 1, and 5 mg of the calcined powder of porphyrin complex obtained in Production Example 2 were mixed (mass ratio cobalt supported PPy-C:porphyrin complex=5:5).

In the test piece 2, the amount of the cobalt supported in the electrode was 30 ng/cm$^2$.

In the test piece 2, the mass ratio (cobalt derived from cobalt supported PPy-C:cobalt derived from porphyrin complex) of the cobalt derived from cobalt supported PPy-C to the cobalt derived from porphyrin complex was 56:44.

Reference Example 3

A test piece 3 was obtained in the same manner as in Reference Example 1, except that 3 mg of the dried power of the cobalt supported PPy-C obtained in Production Example 1 and 7 mg of the calcined powder of the porphyrin complex obtained in Production Example 2 were mixed (mass ratio cobalt supported PPy-C:porphyrin complex=3:7).

In the test piece 3, the amount of the cobalt supported in the electrode was 30 ng/cm$^2$.

In the test piece 3, the mass ratio (cobalt derived from cobalt supported PPy-C:cobalt derived from porphyrin complex) of the cobalt derived from cobalt supported PPy-C to the cobalt derived from porphyrin complex was 35:65.

Reference Example 4

A test piece 3 was obtained in the same manner as in Reference Example 1, except that 3 mg of the dried power of the cobalt supported PPy-C obtained in Production Example 1 and 7 mg of the calcined powder of the porphyrin complex obtained in Production Example 2 were mixed (mass ratio cobalt supported PPy-C:porphyrin complex=8:2).

In the test piece 3, the amount of the cobalt supported in the electrode was 30 µg/cm$^2$.

In the test piece 3, the mass ratio (cobalt derived from cobalt supported PPy-C:cobalt derived from porphyrin complex) of the cobalt derived from cobalt supported PPy-C to the cobalt derived from porphyrin complex was 84:16.

Reference Example 5

A test piece 3 was obtained in the same manner as in Reference Example 1, except that 3 mg of the dried power of the cobalt supported PPy-C obtained in Production Example 1 and 7 mg of the calcined powder of the porphyrin complex obtained in Production Example 2 were mixed (mass ratio cobalt supported PPy-C:porphyrin complex=2:8).

In the test piece 3, the amount of the cobalt supported in the electrode was 30 µg/cm$^2$.

In the test piece 3, the mass ratio (cobalt derived from cobalt supported PPy-C:cobalt derived from porphyrin complex) of the cobalt derived from cobalt supported PPy-C to the cobalt derived from porphyrin complex was 24:76.

Reference Examination Example 1

Measurement of Activity of the Oxygen-Side Electrode

The activity of the oxygen-side electrode was measured by electrochemical measuring method (cyclic voltammetry) using a rotary disc electrode.

More specifically, a potential was scanned in 1 mol/L of an aqueous solution of potassium hydroxide in which oxygen had been deaerated by nitrogen bubbling to stabilize the test pieces obtained in Reference Examples 1 to 5 and to perform background measurement of the test piece.

Subsequently, oxygen was saturated by bubbling oxygen in the aqueous solution, and the potential was scanned by a potentiostat (counter electrode: Pt wire)(trade name: Pt wire, manufactured by The Nilaco Corporation) to cause an oxygen reduction reaction (reaction formula: $O_2+2H_2O+4e^-\rightarrow 4OH^-$), the oxygen reduction activity of the electrodes of test pieces 1 to 3 (oxygen-side electrode) was measured. The potential scanning range in Example 1 and Comparative Example 1 was −0.32 V (vs. RHE) to 1.02 V (vs. RHE). The number of revolution of the electrode was set to 1600 rpm.

Figure 2:
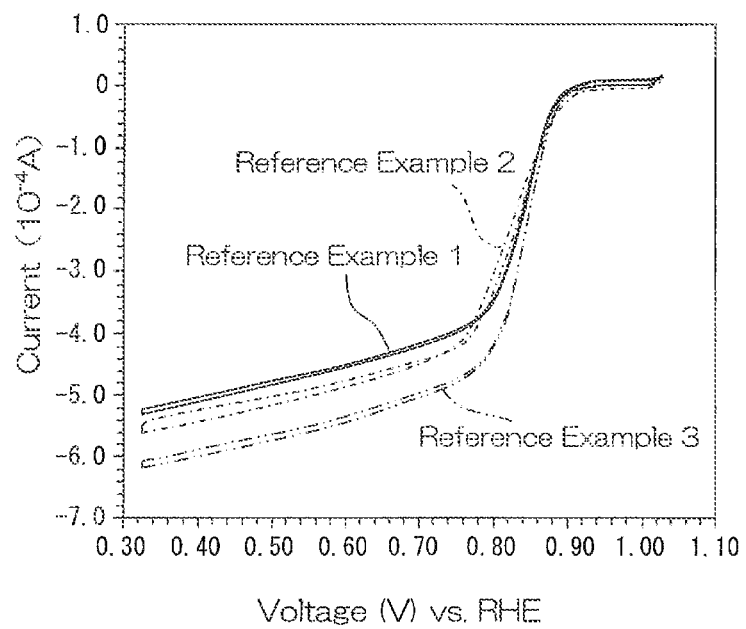
FIG. 2 is a graph illustrating activities of the oxygen-side electrode in Reference Examples 1 to 3.
Figure 3:
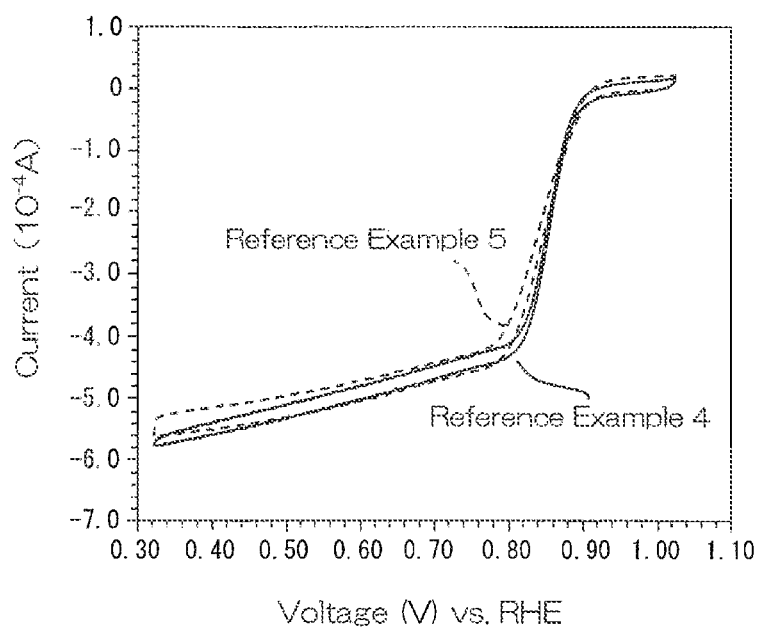
FIG. 3 is a graph illustrating activities of the oxygen-side electrode in Reference Examples 4 and 5.

The obtained potential-electric current curves are shown in FIG. 2 and FIG. 3.

It was confirmed that with all of the test pieces 1 to 5, that is, the test pieces in which mixing ratio (mass ratio cobalt supported PPy-C:porphyrin complex) of the cobalt supported PPy-C to the porphyrin complex was 8:2, 7:3, 5:5, 3:7, and 2:8, the same level of oxygen reduction activity was obtained.

The result confirmed that in the fuel cell having the oxygen-side electrode of Reference Examples 1 to 5, the oxygen reduction reaction in the oxygen-side electrode was activated, and power-generating performance can be improved.

Example 1

(1) Production of Membrane-Electrode Assembly (1-1) Formation of Fuel-Side Electrode 0.2 g of nickel, and 1.1 g of a 2 mass % anion exchange resin solution (solvent: THF+1-propanol (1:4 mass ratio)) were mixed, and the obtained mixture was added to 5.1 mL of a solvent (THF+1-propanol (1:4 mass ratio)). Then, the mixture was stirred at 25° C. for 15 minutes, thereby preparing a fuel-side electrode ink of nickel-supporting anion exchange resin.

The obtained fuel-side electrode ink was applied by spraying so as to cover one surface of the anion exchange membrane.

Thereafter, the fuel-side electrode ink was dried at 25° C., thereby forming a fuel-side electrode having a thickness of 20 nm. In the obtained fuel-side electrode, the amount of nickel supported was 2.5 mg/cm$^2$.

(1-2) Formation of Oxygen-Side Electrode 0.1 g of the dried powder of the cobalt supported PPy-C obtained in Production Example 1, and 0.1 g of the calcined powder of the porphyrin complex obtained in Production Example 2 (mass ratio cobalt supported PPy-C:porphyrin complex=5:5), and 1.9 g of a 2 mass % solution (solvent: THF+1-propanol (1:4 mass ratio)) of an anion exchange resin were mixed.

Then, the obtained mixture was added to 3 mL of the same solvent (THF+1-propanol (1:4 mass ratio)), and the mixture was stirred at room temperature for 15 minutes, thereby preparing an oxygen-side electrode ink.

The obtained oxygen-side electrode ink was applied by spraying so as to cover the other side of the anion exchange membrane (the other side relative to one side where the fuel-side electrode is formed).

Thereafter, the oxygen-side electrode ink was dried at room temperature, thereby forming an oxygen-side electrode. In the obtained oxygen-side electrode, the amount of cobalt supported was 0.2 mg/cm$^2$.

By conducting the above steps, a membrane-electrode assembly including a fuel-side electrode, an air-side electrode, and an electrolyte layer was made.

(2) Assembly of Unit Cell

A carbon sheet (gas diffusion layer) of conductive porous body was fixed to each of the fuel-side electrode layer and the air-side electrode layer of the membrane-electrode assembly obtained in (1); an O-ring (sealing material) was attached to the membrane-electrode assembly to which the carbon sheet was fixed; and the membrane-electrode assembly was sandwiched with the fuel-side separator and the air-side separator, thereby assembling a unit cell.

Comparative Example 1

A membrane-electrode assembly was made in the same manner as in EXAMPLE 1 (1), except that in the formation of the oxygen-side electrode of the above-described (1-2), 0.2 g of the dried powder of the cobalt supported PPy-C obtained in Production Example 1 was used, and the calcined powder of the porphyrin complex obtained in Production Example 2 was not blended (mass ratio cobalt supported PPy-C:porphyrin complex=10:0). The amount of cobalt supported in the oxygen-side electrode was 0.2 mg/cm$^2$.

A unit cell was assembled in the same manner as in EXAMPLE 1 (2).

Comparative Example 2

A membrane-electrode assembly was made in the same manner as in EXAMPLE 1 (1), except that in the formation of the oxygen-side electrode of the above-described (1-2), 0.18 g of the dried powder of the cobalt supported PPy-C obtained in Production Example 1, and 0.02 g of the calcined powder of the porphyrin complex obtained in Production Example 2 was mixed (mass ratio cobalt supported PPy-C:porphyrin complex=9:1). The amount of cobalt supported in the oxygen-side electrode was 0.2 mg/cm$^2$.

A unit cell was assembled in the same manner as in EXAMPLE 1 (2).

Comparative Example 3

A membrane-electrode assembly was made in the same manner as in EXAMPLE 1 (1), except that in the formation of the oxygen-side electrode of the above-described (1-2), 0.02 g of the dried powder of the cobalt supported PPy-C obtained in Production Example 1, and 0.18 g of the calcined powder of the porphyrin complex obtained in Production Example 2 were mixed (mass ratio cobalt supported PPy-C:porphyrin complex=1:9). The amount of cobalt supported in the oxygen-side electrode was 0.2 mg/cm$^2$.

A unit cell was assembled in the same manner as in EXAMPLE 1 (2).

Comparative Example 4

A membrane-electrode assembly was made in the same manner as in EXAMPLE 1 (1), except that in the formation of the oxygen-side electrode of the above-described (1-2), 0.2 g of the calcined powder of the porphyrin complex obtained in Production Example 2 was used, and the dried powder of the cobalt supported PPy-C obtained in Production Example 1 was not blended (mass ratio cobalt supported PPy-C:porphyrin complex=0:10). The amount of cobalt supported in the oxygen-side electrode was 0.2 mg/cm$^2$.

A unit cell was assembled in the same manner as in EXAMPLE 1 (2).

Test Example 1

Measurement of Generated Voltage

A 1 N aqueous solution of KOH of 1 mol/dm$^3$ of hydrated hydrazine was supplied into the fuel-side electrode at a speed of 2 mL/min and saturated humidified air of 50° C. was supplied to the air-side electrode at a speed of 0.5 L/min of the unit cell assembled in Example 1 and Comparative Examples 1 to 4. The operating conditions of the unit cell were set as follows: the feeding pressure was 20 kPa·abs and the cell operating temperature was 80° C.

Figure 4:
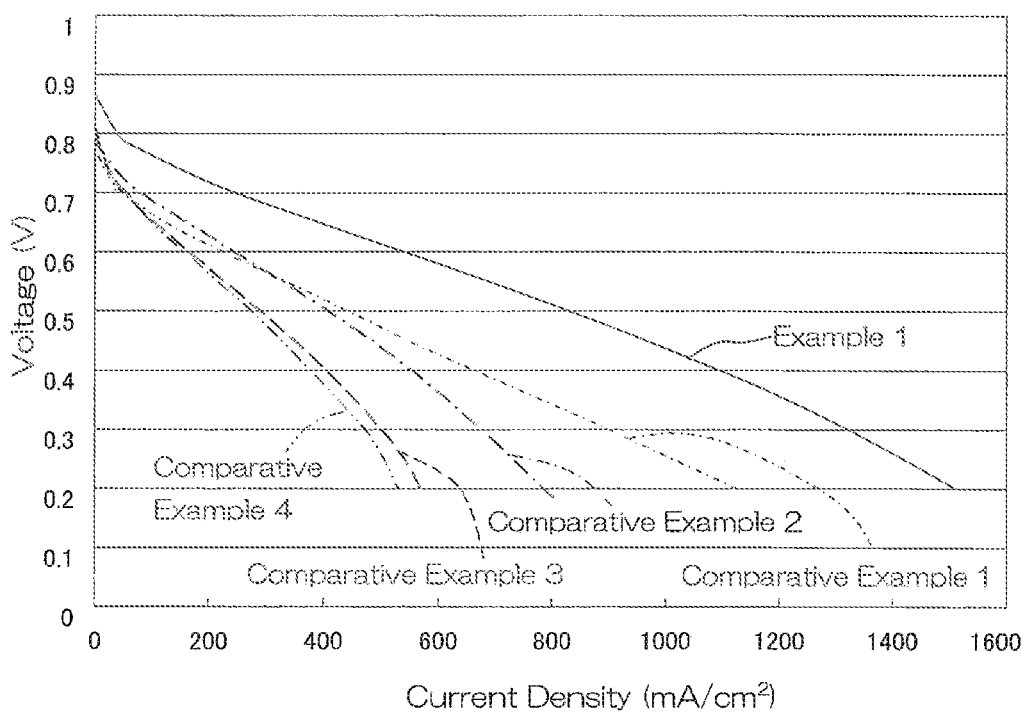
FIG. 4 is a graph illustrating the relationship between the current density and the generated voltage.

The current density and the voltage at that time were measured by electron load (manufactured by Scribner). The results are shown in FIG. 4.

The present invention is not limited to the description above, and various design changes can be applied in the scope recited in claims.

While the illustrative embodiments of the present invention are provided in the above description, such is for illustrative purpose only and it is not to be construed restrictively. Modifications and variations of the present invention that will be obvious to those skilled in the art is to be covered by the appended claims.

INDUSTRIAL APPLICABILITY

A fuel cell of the present invention is suitably used, for example, as a power supply for driving motor in automobiles, ships, aircrafts, etc., and power supply in communications terminal such as cellular phones.

The invention claimed is:

1. A fuel cell comprising:
   an electrolyte allowing an anion component to migrate; and
   a fuel-side electrode and an oxygen-side electrode arranged to face each other while sandwiching the electrolyte,
   wherein the oxygen-side electrode contains a first catalyst containing a first transition metal and polypyrrole, and a second catalyst containing a second transition metal and a porphyrin ring-containing compound, and
   the mixing ratio of the first catalyst relative to 100 parts by mass of the total amount of the first catalyst and the second catalyst is 20 to 80 parts by mass.

2. The fuel cell according to claim 1, wherein the first transition metal and the second transition metal are cobalt.

* * * * *